UNITED STATES PATENT OFFICE.

IMRE UJHÁZY, OF OSAKA, VIRGINIA.

ARTIFICIAL BUILDING COMPOSITION.

1,141,591. Specification of Letters Patent. Patented June 1, 1915.

No Drawing. Application filed October 30, 1914. Serial No. 869,397.

*To all whom it may concern:*

Be it known that I, IMRE UJHÁZY, subject of the King of Hungary, residing at Osaka, in the county of Wise and State of Virginia, have invented certain new and useful Improvements in Artificial Building Compositions, of which the following is a specification.

This invention relates to a composition of matter in the form of a building composition such as artificial stone or similar composition.

The primary object of the invention is to provide a composition of matter that is waterproof, is a heat and a cold insulator, and is especially adapted for employment as a floor covering and for the formation of walls and structural ornaments.

The composition, being softer than stone and lighter in weight than cement, can be readily molded and more easily formed into ornamental work as well as in floor, step and wall structures than can be done with the usual cement. The composition is sufficiently light to float in the water and boats may be formed therefrom, while its general finished appearance is normally of a light color which may be changed at will by the addition of desirable coloring compounds.

My composition is prepared in the form of a plastic which readily sets and hardens when molded into the desired forms. The composition consists of the following ingredients combined in substantially the proportions hereinafter specified:—1 lb. saw dust. 3 ounces of cream cheese. 1 and ½ ounces of caustic or slaked lime. ½ ounce borax dissolved in $\frac{1}{10}$ of a quart of water.

The sawdust, cream cheese and caustic lime are prepared, mixed together and are then thoroughly mixed with the borax and water solution which forms a plastic composition.

While I am aware that one or more of the above ingredients such as cream cheese as well as sawdust have heretofore been employed in a building composition, I am not aware that the combination of all of my above-named ingredients have ever been so employed or that the relative proportions and solutions named have ever been used, and I therefore confine myself to the ingredients employed and for the purpose stated. The commingling of all of said ingredients unitedly in a single composition and most perfectly in the exact proportions named, produces a readily moldable building composition which is clearly superior to that obtained by a substitution for any of the ingredients now employed or an elimination of any of the same.

Having described my invention, what I claim as new and desire to secure by Letters Patent of the United States is:—

A building composition comprising the following ingredients and proportions thereof:—one pound of sawdust, three ounces of cream cheese, one and one-half ounces of slaked lime mixed with a solution of one-half ounce of borax dissolved in one-tenth of a quart of water.

In testimony whereof I affix my signature in presence of two witnesses.

IMRE UJHÁZY.

Witnesses:
  FRENK MARTHAY,
  ELEK NOOGY.